Dec. 21, 1965  R. NEBOLSINE  3,224,593
APPARATUS FOR SEPARATION OF OIL FROM AQUEOUS MIXTURES
Filed May 23, 1961

INVENTOR.
Ross Nebolsine
BY H. Lee Helmes
Attorney

United States Patent Office 3,224,593
Patented Dec. 21, 1965

3,224,593
APPARATUS FOR SEPARATION OF OIL FROM AQUEOUS MIXTURES
Ross Nebolsine, 64 E. 86th St., New York, N.Y.
Filed May 23, 1961, Ser. No. 112,078
1 Claim. (Cl. 210—519)

The primary object of the invention is to provide an efficient apparatus which will act to effectively separate oil from a mixture of oil and waste water, which waste water may contain solid particles.

The invention will be described with reference to the accompanying drawings, in which FIG. 1 is a view in elevation of an embodiment of the invention, certain parts being shown in dotted lines and other parts being broken away.

FIG. 2 is a view similar to FIG. 1 but substantially confined to the interior of the separation tank and thus a plurality of the elements shown in FIG. 1 having been omitted.

FIG. 3 is a schematic flow diagram showing in outline a suitable tank.

FIG. 4 is a transverse section taken through the waste water discharge collector 9 along line A—A of FIG. 2.

The mixture enters upper chamber 2 of tank 1 by inflow pipe 4 coming from oil pumps (not shown). Within tank 1 pipe 4 leads to circular perforated distributing pipe 5, which extends around a cone-shaped perforated deflector 6. Horizontal distributing pipe 5 is apertured for discharge of the mixture along the sides of the deflector 6.

The mixture tends to flow to the bottom of the lower chamber of tank 1 and therefore will occupy the volume of the chamber 3. However, the oil, being lighter will rise through the waste water, as indicated by the arrows at 7. At 8 is shown the maximum waste water level.

At the bottom of the tank is a perforated waste water discharge collector 9 led by rising pipe 10 to an outflow 11 having vent siphon breaker 12, and thence the waste water is led by discharge pipe 13 to a primary tank of a scale pit (not shown). At 14 is shown the normal liquid level. An emergency overflow 15 is provided, drained by pipe 16 and leading the fluid to sump pit 17.

The overflow effect through pipe 11 will be caused by the level of the fluid within the tank. For emptying the tank 1 a discharge pipe 18 is provided, leading to control valves 19 and 20, by which the drained waste water may flow either to a sump pit 17 or through branch pipe 21.

The above discharge elements are particularly for the discharge of waste water and sludge from which oil has been separated. A discharge oil pipe is shown at 23, controlled by valve 24. At 25 is shown a swivel joint for a tank truck loading arm.

For inspection of the material normally discharged to pipe 23, a branch pipe 26 leads downward and has a discharge end 27 controlled by valve 28. By opening the valve a small quantity of fluid may be led into funnel 29 to a receiving member which may, if desired, be connected by pipe 30 for discharge at 31 into a sump pit. Thus, by opening valve 28 a small quantity of fluid may be collected and inspected to determine the presence of oil at pipe 23 and therefore indicate when the upper portion 2 of tanks 1 should be emptied.

At 33 is a vent and at 32 a manhole on the tank top and at the side are provided, at 34 is shown access ladder to the tank top. At 35 is shown the reinforced concrete slab and 36 the four reinforced concrete piles, as tank foundation.

Instead of two separate tanks, for oil separation and oil storage, the apparatus provides one combined oil storage and oil separation tank, with special inflow and outflow devices and baffles, which by continuous action increases the efficiency of oil separation, thus reducing the size of facilities, space requirements and intermediate pumping units.

While the perforations in the cone-shaped deflector 6 are desirable they are not essential, and for example the deflector may be made of screen material. In the operation of the structure, the oil and water mixture, which will contain fine scale particles in many cases wherein the mixture comes from hot rolling mills or the like, will be pumped into pipe 4 and discharged into tank area 3 through the perforations in ring-shaped distributing pipe 5, the latter discharging along the wall of the deflector 6, intending to wash off any accumulated oil particles on the screen surface. This action will continue until the mixture rises to the discharge pipe 23, whereupon the inflow is shut off for a predetermined period of time, sufficient to cause flotation of the oil, whereupon the mixture is permitted to enter area 3 of the tank, in a degree sufficient to raise the oil strata to discharge pipe 23, valve 24 being opened, and discharge continuing until the oil strata is completely removed from the upper chamber 2. As shown by the arrows in FIG. 2, the conical deflector aids the rise and flotation of the oil by imposing a downward pressure along the wall of the deflector outwardly of its open end.

In some cases, as where the oil is light and in substantial ratio to the water, the operation may be continuous, and the inflow of the mixture being proportioned to the outflow of the oil strata, through discharge pipe 23.

Having described my invention, what I claim and desire by Letters Patent, is as follows:

Apparatus for combined oil storage and separation of oil from aqueous mixtures thereof, consisting of a tank having a first and lowermost chamber and a second and uppermost fluid storage and settling chamber, an inverted frusto-conical open ended screen-like baffle positioned in the tank with the major diameter of the baffle substantially at the meeting line of the two chambers, the conical portion of said baffle projecting downwardly into the lowermost chamber said downwardly projecting portion of the frusto-conical screen-like baffle being spaced from the wall of the tank; and the uppermost chamber being adapted as an oil storage area above said screen-like baffle, a perforated circular fluid distributing conduit adjacent the outer top area of said screen-like baffle and discharging along the outer wall surface of the baffle, means for delivering a charge of oil-containing fluid to said distributing conduit and therefrom downwardly along the outer wall of said baffle, and thence into said lowermost chamber toward the base thereof, said screen-like baffle providing upward flow of fluid therethrough from the lowermost chamber to the uppermost fluid storage and settling chamber through the open ends of said baffle, a discharge conduit at the base area of the tank, distributing means in the base area of said tank and communicating with said discharge conduit for removing aqueous fluid from said lowermost chamber, a valve-controlled outflow conduit in the uppermost storage and settling chamber adapted to continuously discharge oil-rich fluid from said uppermost chamber as fresh aqueous oil mixture is admitted to the lowermost chamber, means for maintaining the level of the aqueous fluid above said screen-like baffle including syphon means connected to said discharge conduit, and said frusto-conical screen-like baffle having its minor diameter at its lower end and adapted to direct the flow of the aqueous mixture from the fluid distributing conduit toward the center area of the lowermost chamber.

References Cited by the Examiner
UNITED STATES PATENTS

| | | | |
|---|---|---|---|
| 518,238 | 4/1894 | Fullner | 210—533 X |
| 1,490,794 | 4/1924 | Alexander | 210—84 |
| 1,639,373 | 8/1927 | Glover | 210—519 |
| 1,702,613 | 2/1929 | Morse | 210—84 X |
| 2,348,167 | 5/1944 | Erwin | 210—83 X |
| 2,565,343 | 8/1951 | Benham | 210—512 |
| 2,777,581 | 1/1957 | Unthank | 210—519 |

FOREIGN PATENTS

| | | |
|---|---|---|
| 614,612 | 9/1926 | France. |

REUBEN FRIEDMAN, *Primary Examiner.*

HERBERT L. MARTIN, *Examiner.*

J. DE CESARE, R. A. CATALPA, *Assistant Examiners.*